Figure 3:
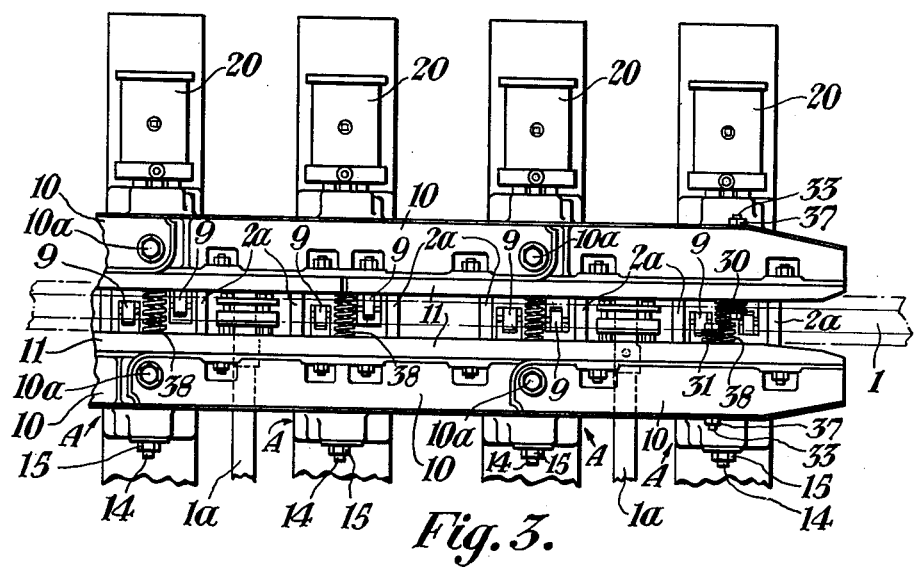

March 10, 1953
H. L. BONE
2,630,884
RAILWAY BRAKING APPARATUS
Filed July 13, 1948
3 Sheets-Sheet 1
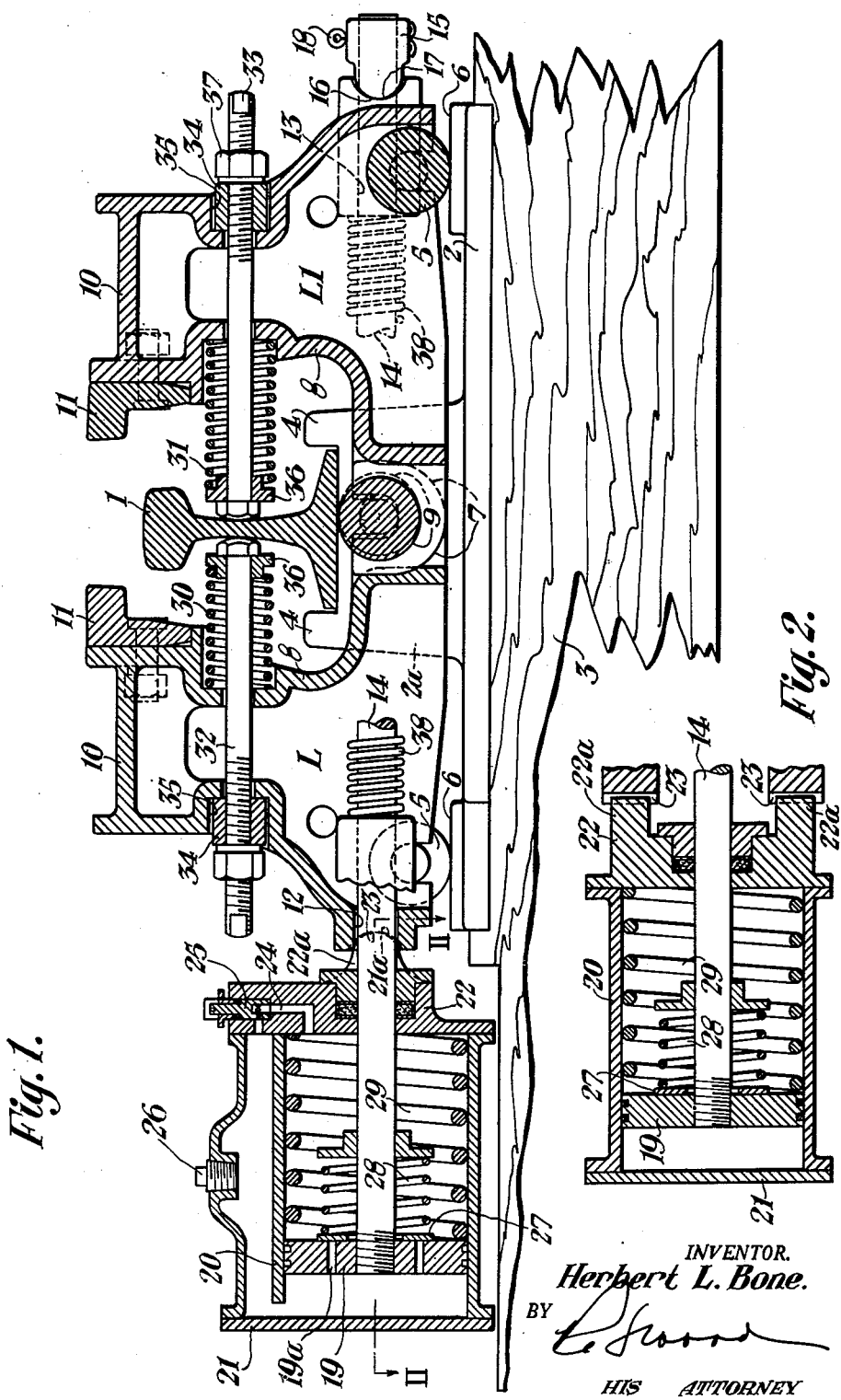
INVENTOR.
Herbert L. Bone.
BY
HIS ATTORNEY March 10, 1953  H. L. BONE  2,630,884
RAILWAY BRAKING APPARATUS
Filed July 13, 1948  3 Sheets-Sheet 2

INVENTOR.
Herbert L. Bone.
BY
HIS ATTORNEY

Patented Mar. 10, 1953

2,630,884

UNITED STATES PATENT OFFICE 2,630,884

RAILWAY BRAKING APPARATUS

Herbert L. Bone, Forest Hills, Pa., assignor to Westinghouse Air Brake Company, a corporation of Pennsylvania Application July 13, 1948, Serial No. 38,446

13 Claims. (Cl. 188—62)

My invention relates to railway braking apparatus, and particularly to that class of braking apparatus known as car retarders.

My invention is illustrated herein as applied to an inert car retarder, which may be defined as a car retarder which does not derive its braking force from an external source of power. Two types of inert car retarders are shown, one in which the braking force is proportional to the weight of the car, and another in which the braking force is independent of the car weight. While my invention has certain features of especial utility in connection with car retarders of the types shown, other features are of general utility in connection with other types of car retarders.

One object of my invention is to provide a car retarder unit in which the braking force acting on a car wheel is substantially reduced after it has been acting for a predetermined period of time.

Another object is to provide an inert car retarder unit of the type in which the braking force is proportional to the car weight, including means for substantially reducing the braking force if a car wheel remains in the retarder unit for a predetermined period of time.

Another object is to provide an improved car retarder in which the braking force is substantially reduced if the speed of the car through the retarder falls below a predetermined value.

Another object is to provide a car retarder unit in which the braking force is gradually reduced as long as a car is in the retarder unit, so that the force is substantially removed if the car remains in the unit for a predetermined time.

Another object is to provide, in a car retarder unit of the type described, means for adjusting the period of time during which a wheel may remain in the retarder before the braking force is substantially removed.

Another object is to provide improved car retarders of the type shown in my prior Letters Patent of the United States, No. 2,273,481, issued on February 17, 1942, for Railway Braking Apparatus, and No. 2,104,606, issued January 4, 1938, for Railway Braking Apparatus.

In one modification of my invention disclosed herein, the car retarder unit comprises two levers pivoted on opposite sides of a track rail which is free to move vertically. Each lever is provided with one arm which engages the underside of the track rail and a second arm which extends upwardly alongside the track rail and supports a braking bar for engagement with the sides of car wheels traversing the rail. The braking bars are normally spaced apart a distance less than the width of the car wheels. When a car wheel enters the retarder unit, it forces the braking bars apart, thereby rotating the levers about their fulcrums so as to lift the rail vertically. Hence the weight of the car acts through the levers to exert on the braking bars a force which is proportional to the weight of the car. The fulcrum points of the levers are restrained from moving with respect to each other by a time delay device which in the modification shown takes the form of a hydraulic buffer. This buffer includes a cylinder operatively connected to one lever and a piston operatively connected to the other lever and movable in the cylinder. A restricted passage between the ends of the cylinder serves to delay relative movement of the piston and cylinder. When the braking bars are applied to a car wheel as the wheel moves into the retarder unit, a force is applied to the fulcrums of the two levers which tends to separate the fulcrum points. This force is resisted by the buffer cylinder. As long as the wheel remains in the retarder unit, the fulcrums slowly separate. If the car wheel remains in the retarder unit for a period of time determined by the dimensions of the restricted passage connecting the ends of the buffer cylinder, then the cylinder and pistons will move relative to each other sufficiently to lower the rail onto its normal rail support. This effectively removes the braking force from the lever and hence from the brake bars. A check valve is provided to permit rapid movement of the buffer cylinder and pistons in the restoring direction after the car has passed over the retarder unit. Means are provided for varying the area of the restriction in the passage connecting the ends of the cylinder so as to vary the time required for the buffer to release the braking bars.

In the other modification of my invention shown herein, the braking bars are biased toward their braking positions by a compression spring which is mechanically connected to both bars. The mechanical connection between the spring and one of the bars includes a time delay mechanism of the hydraulic buffer type, similar to that described in connection with the first modification of my invention.

When the braking bars are spread by a vehicle wheel entering the retarder unit, the spring is compressed. As long as the wheel holds the bars separated the piston and cylinder of the buffer mechanism move slowly in a direction to release the spring compression and thereby reduce the braking force. If the wheels remain in the retarder unit for more than a predetermined time, the braking force is reduced substantially to zero.

Other objects and characteristic features of my invention will become apparent as the description proceeds.

I shall illustrate and describe herein two forms of railway braking apparatus embodying my invention, and shall then point out the novel features thereof in claims.

Figure 5:
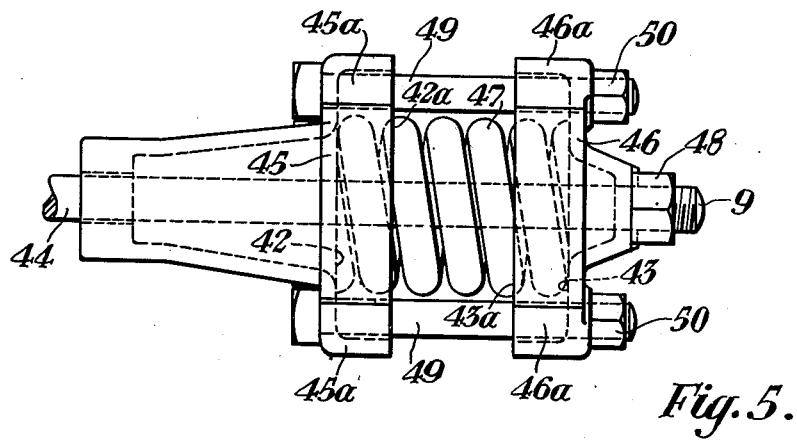
Figure 6:
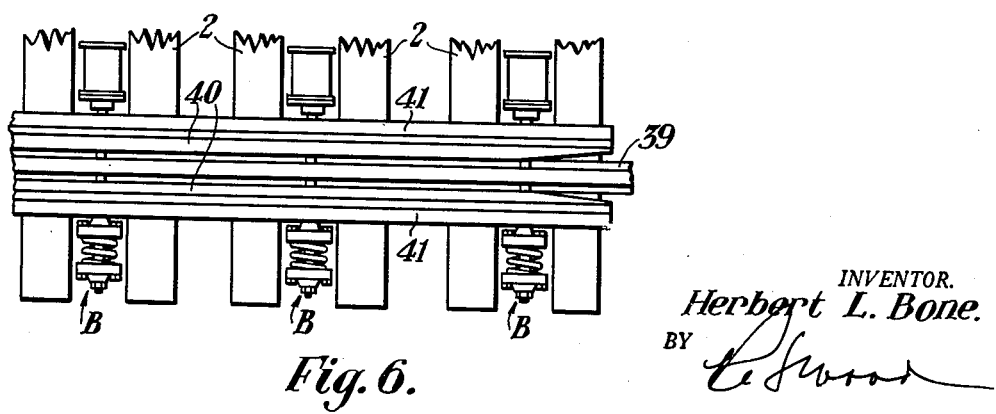
Figure 4:
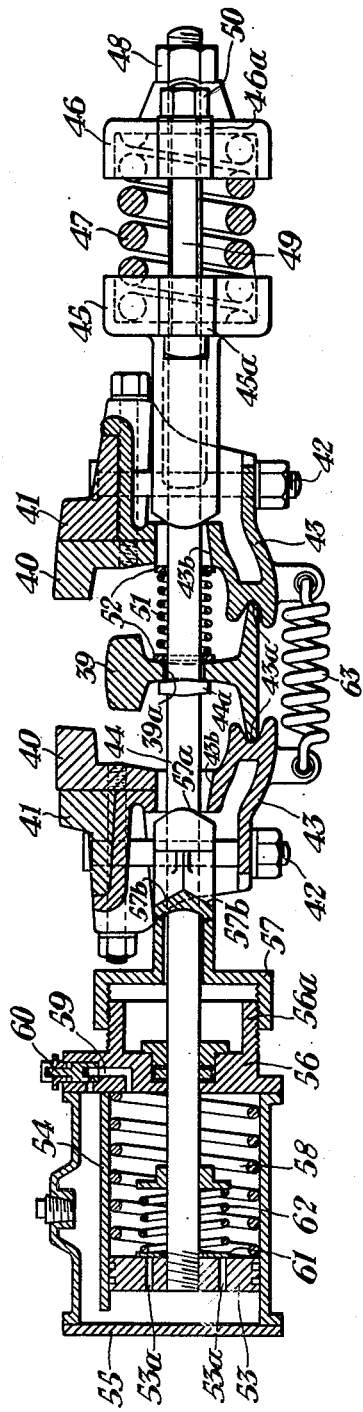

In the accompanying drawings, Fig. 1 is a vertical sectional view showing one form of car retarder unit embodying my invention. Fig. 2 is a fragmentary sectional view taken on the line II—II of Fig. 1. Fig. 3 is a fragmentary plan view of a retarder comprising several of the retarder units of Figs. 1 and 2. Fig. 4 is a sectional view of a modified form of retarder unit also embodying my invention. Fig. 5 is a fragmentary plan view of part of the retarder unit of Fig. 4. Fig. 6 is a fragmentary plan view of a complete retarder comprising several of the retarder units of Figs. 4 and 5.

Figs. 1 to 3

Referring to the drawings, the reference character 1 designates one track rail of a stretch of railway track provided with one form of braking apparatus embodying my invention. The rail 1 normally rests on supports 2 mounted on ties 3. Each support 2 is provided with two upstanding ribs 2a which receive the rail between spaced vertical lugs 4 projecting from their upper surface. The rail is at times moved upwardly from its normal position of rest on the ribs 2a, in a manner to be described hereinafter. The lugs 4 guide the rail during its vertical movement. Tipping of the rail 1 is prevented by tie bars 1a (see Fig. 3) of well-known construction, which secure the rail 1 at spaced intervals to the opposite running rail. The latter rail is intended to be supported for limited vertical movement in a manner similar to the rail 1.

Disposed at spaced intervals along the rail 1 are a plurality of retarder units A. Each unit (see Fig. 1) comprises two similar levers L and L1 pivotally supported on opposite sides of the rail by means of rollers 5 which ride on flat surfaces 6 provided on the support 2. The levers are substantially L-shaped, and each is provided with a horizontal arm 7 and with a vertical arm 8. The horizontal arm 7 of each lever extends underneath the rail and carries a roller 9 which engages the underside of the rail, while the vertical arm 8 of each lever terminates at its upper end in a brake beam 10, which may be cast integrally with the vertical arm of the corresponding lever of at least one adjacent unit. It should be distinctly understood, however, that my invention is not limited to this particular construction. The ends of adjoining brake beams 10 overlap and are bolted together, as shown at 10a (Fig. 3). Removably secured to the brake beams 10 are brake shoes 11 disposed in a position to frictionally engage the adjacent side faces of car wheels traversing the rail 1. The shoes 11 are built in sections and have the ends of the sections staggered with respect to the bolted joints 10a between adjacent brake beams.

The levers L and L1 of each retarder unit are provided with aligned openings 12 and 13. A spring bolt 14 extends with clearance through these openings. One end of bolt 14 is provided with a rocker nut 15 having rounded projections 16 disposed on opposite sides of the bolt and fitting into mating grooves 17 formed in the lever L1 adjacent the outer end of the opening 13. The nut 15 is arranged to be locked against rotation relative to the bolt by means of a cotter key 18.

The other end of the spring bolt 14 is attached to a piston 19 which moves in a cylinder 20. The outer end of cylinder 20 is closed by a cover plate 21. The inner end of the cylinder 20 is closed by a base casting 22 provided with rockers 22a which rest in grooves 23 formed in the lever L.

The opposite ends of cylinder 20 are hydraulically connected through a passage 24 and a plug 25 having several orifices of different areas. The plug 25 may be angularly adjusted, in a well-known manner, so as to connect any of the several orifices in series with the passage 24. A filler plug 26 is provided for filling the cylinder 20 and its associated fluid passages with a suitable hydraulic fluid.

The piston 19 is provided with apertures 19a, which are closed by a disc valve 27 biased to its closed position by a spring 28. A return spring 29 biases the piston 19 for movement to the left, as viewed in the drawings.

The retarder unit illustrated also includes means for positioning the brake shoes laterally with respect to the rail when no car is traversing the rail 1 to facilitate the smooth entry of car wheels into the retarder. As here shown, these means comprise springs 30 and 31 mounted on spring bolts 32 and 33. The spring bolts extend through clearance holes in the levers L and L1 and are provided adjacent their outer ends with non-circular nuts 34 which fit into non-circular recesses 35 in the levers in such manner that the nuts are prevented from rotating in response to rotation of the bolts. The nuts 34 are free to move outwardly in the recesses in the event the associated braking bar is moved closer to the rail than the position to which it is biased by the associated springs. The springs are disposed on the bolts between the inner sides of the vertical arms 8 and spring seats 36 which abut against the heads of the bolts, and serve to bias the bolts to the positions in which the heads of the bolts engage the web of the rail 1. To facilitate adjusting the bolts the outer ends of the bolts are flattened on two sides for the reception of a wrench or equivalent tool, and lock nuts 37 are provided to lock the bolts in their adjusted positions. The bolts are so adjusted that when the heads of the bolts are engaging the web of the rail and the nuts 34 are engaging the inner ends of the recesses 35 the levers will occupy the proper positions relative to the rail to cause a smooth entry of car wheels between the brake shoes.

A spacing spring 38 encircles the spring bolt 14 between the levers and biases the lever L to a position in which the rockers 22a engage the groove 23. It also biases the lever L1 to a position in which the groove 17 engages the projection 16 on the rocker nut 15.

The whole assembly including levers L and L1 is free to move laterally as a unit on the rollers 5. Such bodily movement of the levers L and L1 accommodates various lateral positions of a car wheel with respect to the rail 1. The spacing between the shoes 11 is determined by the adjustment of rocker nut 15 on the spring bolt 14. The normal positions of the individual shoes 11 with respect to the rail 1 are determined by the adjustment of the nuts 34.

The springs 30 and 31 are in effect centering springs which determine the position of the braking bars 11 with respect to rail 1. Should the entire assembly including levers L and L1 move laterally to accommodate a wheel entering the retarder in an unusual position with respect to rail 1, then the springs 30 and 31 would act to restore the assembly including levers L and L1 to its normal position after the wheel had left the retarder.

Operation

Considering first the operation of an individual car retarder unit, it may be seen that when a car enters the retarder unit, its wheels force the brake shoes 11 apart. This tends to move the levers L and L1 laterally away from the rail. Such opposite lateral movements of the levers L and L1 are restrained, however, by the spring bolt 14 and its associated parts including the buffer piston 19 and cylinder 20. The spreading apart of the brake shoes 11 therefore causes the levers L and L1 to rotate about their respective pivot rollers 5. The horizontal arms 7 of the levers move upwardly, lifting the rail 1 on the rollers 9. The raising of the rail lifts the car with it, and the car then acts through the rails to exert a downward force on the horizontal lever arm 7 which urges the brake shoes 11 into frictional engagement with opposite side faces of the car wheels. This frictional force is proportional to the weight of the car, the proportionality being determined by the relative lengths of the horizontal lever arms 7 and the vertical lever arms 8.

The weight of the car acting downwardly on the horizontal arms 7 of the levers tends to force the rollers 5 apart. The lever L1 tends to move to the right, carrying with it the spring bolt 14 and buffer piston 19. The lever L tends to move toward the left, carrying with it the base casting 22 and cylinder 20. The weight of the car therefore tends to produce a relative movement of the piston 19 and cylinder 20. This relative movement cannot take place until the hydraulic fluid displaced by piston 19 flows through the passage 24 and the orifice plug 25. The result is a slow relative movement of the piston and cylinder, which allows the rail 1 to return slowly toward its position of rest on the support 2.

If the car passes out of the retarder unit before the rail 1 completes its return to its position of rest on the support 2, then the buffer piston 19 and cylinder 20 have no effect on the braking force applied through the shoes 11.

If the car remains in the retarder unit long enough so that the relative movement of the piston 19 and cylinder 20 allows rail 1 to again reach its position of rest, then the braking force acting through the shoes 11 is substantially eliminated. As soon as the rail 1 reaches its normal rest position, it is supported by the normal rail support 2, and the downward force acting on the horizontal lever arm 7 is reduced to the relatively small value necessary to maintain the several springs in the mechanism in their deflected positions.

From the foregoing, it may be seen that if the speed of the car is such that it passes completely through the retarder unit before the expiration of a predetermined time, then the braking force remains proportional to the car weight throughout the passage through the retarder unit. The length of the predetermined period of time in question is established by the area of the buffer piston and cylinder and the area of the orifice in plug 25 through which the hydraulic fluid must flow during operation of the buffer piston. If the car is moving so slowly that it remains in the retarder unit for a time longer than the predetermined period in question, then the buffer cylinder and piston act to substantially remove the braking force from the shoes 11.

When the shoes are no longer separated by a car wheel, spring 29 moves piston 19 to the left. This produces a pressure differential between the ends of the cylinder which lifts valve 27 off its seat, in opposition to spring 28, and so permits free fluid communication between the cylinder ends through apertures 19a. The piston is thereby enabled to move rapidly under the influence of spring 29, and the parts are restored to their original positions.

In other words, when a car wheel moves through the retarder at a speed greater than a predetermined value, the retarder unit applies a braking force to it continuously as long as it is in the retarder unit. However, when the speed of the car wheel is less than that predetermined value, then the braking force is substantially removed before the car wheel leaves the retarder unit. If for any reason a vehicle wheel stops in the retarder unit, the braking force of the retarder is soon removed so that the wheel may be readily started again.

There is shown in Fig. 3 a portion of a complete car retarder including four of the units illustrated in Figs. 1 and 2. The retarder is articulated by having the ends of the brake bars 10 connected by bolts 10a. The brake shoes 11 are attached to the brake bars with their abutting ends staggered with respect to the ends of the brake bars. This latter arrangement also assists in the articulation of the retarder.

Let it be assumed that a moving car having two four-wheel trucks enters the retarder in Fig. 3, moving from right to left. As the first wheel enters the retarder, the first retarder unit becomes effective to apply a braking force to it. As the first wheel reaches the successive retarder units, they in turn apply braking forces to it. Because of the articulated construction of the retarder, and because of the stiffness of the rail which is lifted by each retarder unit, the respective retarder units do not return to their normal positions within the space provided between the axles of a truck. In other words, the leading wheel on the car will spread these retarder brake shoes and brake bars for some distance ahead and behind the point where it actually engages the brake shoe.

When the first wheel enters the retarder, it starts the timing mechanism for the first retarder unit in operation. In other words, it initiates operation of the piston 19 relative to the cylinder 20. After the first wheel passes beyond the first retarder unit, the spring 29 is not immediately effective to restore that first retarder unit to its normal position, because the first wheel continues to hold the brake shoes 11 separated. The arrangement of the parts is such that the wheel on the second axle of the truck will enter the retarder and apply a separating force to the brake shoes 11 before the spring 29 has moved the piston 19 appreciably back toward its normal position.

It may be seen that the effect on the timing unit of the several successive wheels on one truck is cumulative. In designing a retarder unit, therefore, the time required for the time delay device to effectively release the braking force of the retarder unit must be related to the time required for a complete vehicle truck to pass through the retarder.

The spacing between the retarder units is sufficiently small as compared to the usual distance between successive trucks on the same car that the braking force on the second truck is not reduced by the action of the retarder on the first trucks. The action of the retarder on adjacent trucks of coupled cars depends upon the spacing between the trucks.

For any given time setting of the variable orifice plug 25, the action of one of the retarder units will be different for three different ranges of current speeds. In the high speed range, each truck of the car will pass completely through the retarder unit before the time delay mechanism has released the braking force. As the speed of the moving vehicle decreases, it will reach an intermediate speed range wherein the retarder unit will continue to brake the first wheel of each truck, but will effectively release the braking on the second or successive wheels of each truck before it has completely passed through the retarder unit. In a still lower range of car speeds, the time delay means will be effective to completely release the braking force on the first wheel before it has passed out of the retarder unit.

If for any reason a car stops in the retarder, the braking force will be substantially removed soon after the car stops, so that the car may be readily started again by a trimmer locomotive or by other means. It is true that the retarder will again apply a braking force to the car as soon as it starts moving. However, it is well known that it is easier to overcome a braking force applied to a moving vehicle than to overcome the same braking force applied to a vehicle which is stationary. If the trimmer engine can start the car moving, it will always be able to keep it moving so as to get it completely out of the retarder.

*Figs. 4, 5, and 6*

In these figures my invention is illustrated as applied to a somewhat different type of inert car retarder. In Fig. 6 there is shown a stretch of rail 39 forming one rail of a railway track. On the opposite sides of rail 39 are located brake shoes 40 supported by brake bars 41 which are in turn supported and operated by a plurality of car retarder units B whose mechanism is shown in more detail in Figs. 4 and 5.

The type of car retarder units shown in these figures is, except for the addition of the time delay mechanism, generally similar to that shown in Figs. 9 and 13 to 15 of my prior Patent No. 2,104,606, issued January 4, 1938, for Railway Braking Apparatus. Reference is made to that patent for a more complete description of some of the details of the mechanism.

The brake beams 41 are supported in each car retarder unit on oppositely disposed levers 43. The brake bars 41 are attached to the levers 43 by means of bolts 42. Each lever 43 is provided at the inner side of its lower edge with a channel-shaped recess 43a. These recesses 43a loosely receive the base flanges of the rail 1 so that the levers are free to pivot about the base flanges as a fulcrum.

The web of rail 39 is provided with an aperture 39a and the levers 43 are provided with apertures 43b aligned with the aperture 39a in the web of rail 39. A spring bolt 44 extends through the aligned apertures.

Outside the right-hand lever 43, the spring bolt 44 carries an inner spring seat 45 and an outer spring seat 46, both of which are slidable on the bolt 44. A compression spring 47 is retained between the spring seats 45 and 46. The outward movement of spring seat 46 is limited by an adjusting nut 48. The inner end of spring seat 45 is provided with a convex contour so that it may roll through a limited angle with respect to the lever 43. Spring seat 45 is provided with diametrically opposite apertured lugs 45a (see Fig. 5) and spring seat 46 is similarly provided with lugs 46a. Bolts 49 extend through the apertures in the lugs 45a and 46a, and are provided with adjusting nuts 50. The adjustment of these nuts 50 determines the initial compression of the spring 47.

The spring bolt 44 is provided with a shoulder 44a adjacent the left side of the web of rail 39. A compression spring 51 surrounds the spring bolt 44 between the rail 39 and the right-hand lever 43. The ends of spring 51 are retained by spring retaining washers 52 which abut the rail 39 and the right-hand lever 43, and thereby effectively bias the spring bolt 44 to a normal position wherein the shoulder 44a rests against the web of rail 39.

The other end of spring bolt 44 carries a piston 53 which moves in a cylinder 54. Piston 53 and cylinder 54 correspond generally to the piston 19 and cylinder 20 of Fig. 1. The outer end of cylinder 54 is closed by a cover plate 55. The inner end of cylinder 54 is closed by a base casting 56 having an externally threaded annular projection 56a which is concentric with the spring bolt 44. A sleeve 57 is provided at one end with internal threads for attachment to the projection 56a. The sleeve 57 loosely surrounds the spring bolt 44, and is provided at its right end with a convex surface 57a which rolls through a limited angle on the adjacent lever 43. The exterior of sleeve 57 is provided with hexagonal or other suitable noncircular flats 57b so that it may be easily rotated with a wrench.

Piston 53 is biased to the left by a compression spring 58. The opposite ends of cylinder 54 are connected through a passage 59 and a plug 60 having several orifices of different areas. The passage 59 and plug 60 correspond generally to passage 24 and plug 25 of Fig. 1.

The piston 53 is provided with apertures 53a which are closed by an annular disc valve 61 biased to its closed position by a spring 62. Spring 62 and valve 61 correspond to spring 28 and valve 27 of Fig. 1.

As previously mentioned, the tension of spring 47 may be adjusted by means of the nuts 50. The nut 48 determines the position of brake shoe 40 on the right-hand lever 43 with respect to the rail when no car is in the retarder unit. The position of the left-hand brake shoe 40 with respect to the rail may be adjusted by changing the relative position of the base casting 56 and the sleeve 57. This may be accomplished by holding either one still and rotating the other. If desired, suitable provision may be made on the cylinder 54 for the application of a wrench thereto for adjustment purposes.

A spring 63 is held in tension between the lower ends of levers 43, and acts to hold them in engagement with the sleeve 57a and the spring seat 45, respectively.

Operation of Figs. 4 to 6

When a car wheel moves between the brake shoes 40 of one of the retarder units B, it spreads the brake shoes 40 apart, thereby rotating the levers 43 in opposite directions. This compresses the spring 47, and at the same time, tends to move the piston 53 relative to the cylinder 54. This motion, however, is delayed by the action of the hydraulic fluid flowing through passage 59 and restriction 60.

The initial braking force with which the shoes 40 engage the wheels is determined by the initial tension of the spring 47, by the spring rate of that spring, and by the distance through which that spring is deflected by the spreading of the brake shoes. As soon as the spring 47 is deflected, the piston 53 starts to move gradually with respect to cylinder 54, thereby releasing some of the compression on spring 47 and gradually reducing the braking force applied through the shoes 40 to the wheel. If the wheel remains between the brake shoes 40 for a sufficient length of time, then the piston 53 and spring bolt 44 will move far enough to relieve substantially all except the initial compression in the spring 47, thereby reducing the braking force substantially to zero. In other words, it may be stated that the initial braking force applied to a wheel entering the retarder unit is a predetermined value, and that this force gradually decreases as long as the wheel remains in the retarder unit. If the wheel remains in the unit for a predetermined time, the braking force decreases to zero.

Considering now the operation of a multiple unit retarder as illustrated in Fig. 6, it may be seen that here, in contrast to the multiple unit retarder of Fig. 3, the cumulative time delay effect on successive wheels of a single truck is not so pronounced. Although the articulation between successive units of the car retarder tends to make the time delay cumulative, this type of retarder unit does not lift the rail, and each unit may therefore return to its normal position more readily. Consequently, the initial braking force on the first wheel of a truck entering the retarder has a predetermined value which continually decreases as long as the wheel is in the retarder, and may decrease to zero if the wheel remains in the retarder for a predetermined period of time. The second and successive wheels of the same truck may have a slightly lower initial braking force applied to them as they enter the retarder because the initial braking force has been decreased by the first wheel. If the braking force on the second wheel is smaller, it will decrease to zero in a shorter time than the braking force on the initial wheel.

Consequently, for vehicles moving through the retarder at high speeds, there will be applied to each wheel a braking force which continouously decreases as long as a truck remains within one retarder unit. At a lower range of speeds, the braking force will be reduced substantially to zero before the wheel passes out of the retarder unit. The operation of the retarder is generally similar to that of the retarder of Fig. 3, except that the braking force is gradually reduced as long as the car wheel is in a retarder unit instead of being suddenly reduced at the end of a predetermined time as in the case of Fig. 3. Also, the reduction of the braking force on the following wheels of a truck is substantially less in the type of retarder shown in Fig. 6.

Although I have herein shown and described only two forms of railway braking apparatus embodying my invention, it is understood that various changes and modifications may be made therein within the scope of the appended claims without departing from the spirit and scope of my invention.

Having thus described my invention, what I claim is:

1. Railway braking apparatus, comprising a track rail, a brake shoe, means supporting the shoe alongside the rail in a position to frictionally engage the wheels of a vehicle traversing the rail, means effective upon engagement of the shoe by a vehicle wheel to apply a reactive braking force through the shoe to the wheel, and timing means actuated by a vehicle wheel for substantially reducing said force after it has been applied for a predetermined time.

2. Railway braking apparatus, comprising a track rail, a brake shoe, means supporting the shoe alongside the rail in a position to frictionally engage the wheels of a vehicle traversing the rail, means effective upon engagement of the shoe by a vehicle wheel to apply a reactive braking force through the shoe to the wheel, timing means actuated by a vehicle wheel for substantially reducing said force after it has been applied for a predetermined time, and means for quickly restoring the force applying means and the timing means to their respective original conditions.

3. Railway braking apparatus, comprising a track rail, a pair of brake shoes, a pair of levers, one for supporting each shoe, said levers being located on opposite sides of the rail and supporting the shoes in position to frictionally engage opposite sides of a vehicle wheel traversing the rail, force applying means including said levers and effective upon engagement of the shoes by a vehicle wheel to apply a reactive braking force through the shoes to the wheel, and means for controlling relative movement of the levers in a direction to reduce said force, said controlling means comprising a fluid-filled cylinder connected to one lever, a piston connected to the other lever, and a restricted passage connecting the ends of the cylinder to control the rate of relative movement of the piston and cylinder.

4. Railway braking apparatus, comprising a track rail, a pair of brake shoes, a pair of levers, one for supporting each shoe, said levers being located on opposite sides of the rail and supporting the shoes in position to frictionally engage opposite sides of a vehicle wheel traversing the rail, force applying means including said levers and effective upon engagement of the shoes by a vehicle wheel to apply a reactive braking force through the shoes to the wheel, and means for controlling relative movement of the levers in a direction to reduce said force, said controlling means comprising a fluid-filled cylinder connected to one lever, a piston connected to the other lever, a restricted passage connecting the ends of the cylinder to control the rate of relative movement of the piston and cylinder, and a one-way check valve by-passing the restricted passage to permit rapid relative movement of the levers in a brake applying direction.

5. Railway braking apparatus, comprising a track rail, a pair of brake shoes, a pair of levers, one for supporting each shoe, said levers being located on opposite sides of the rails and supporting the shoes in position to frictionally engage opposite sides of a vehicle wheel traversing the rail, spring means acting on said levers to apply a braking force through the shoes to a wheel engaged thereby, a connection between one end of the spring means and one lever, a connection between the other end of the spring means and the other lever, one of said connections including a fluid-filled cylinder, a piston therein and a restricted passage connecting the ends of the cylinder to control the rate of relative movement of the piston and cylinder.

6. Railway braking apparatus, comprising a section of track rail, means mechanically actuated by the wheel of a vehicle passing over the track section for applying a braking force to the wheel, and means mechanically actuated by a vehicle wheel for reducing the braking force substantially after it has been applied for a predetermined time.

7. Railway braking apparatus, comprising a section of a track rail, a lever having its fulcrum movably supported and having a first arm engaging the underside of the rail and a second arm extending upwardly alongside the rail, a brake shoe on said second arm for frictionally engaging the wheels of a vehicle traversing the rail, said shoe being positioned in the path of the wheels of a vehicle traversing the rail, whereby when a vehicle is traversing the rail the wheels rotate the lever in a direction to raise the rail, thus causing the vehicle to exert on the lever a force proportional to the weight of the vehicle, and time-controlled means for regulating the movement of the lever fulcrum and effective to reduce substantially the braking force exerted on the wheels by the brake shoe after said braking force has been exerted for a predetermined time.

8. Railway braking apparatus, comprising a vertically movable section of a track rail, a support for the rail, two levers having their fulcrums movably supported on opposite sides of the rail, each lever having a first arm engaging the underside of the rail and a second arm extending upwardly alongside the rail, a brake shoe on each of said second arms for frictionally engaging the wheels of a car traversing the rail, said shoes being spaced apart when no car is traversing the rail by a distance less than the width of the car wheels, whereby when a car is traversing the rail the wheels rotate the levers in a direction to raise the rail from its support, thus causing the car to exert on the levers a force proportional to the weight of the car, said force tending to separate said fulcrums so as to restore the rail to its support and thereby substantially reduce the braking force exerted on the wheels, and time-controlled means for regulating the movement of the lever fulcrums and effective when the rail is lifted to delay restoration of the rail to its support for a predetermined time.

9. Railway braking apparatus comprising an inert car retarder unit, and timing means actuated by the wheel of a vehicle for substantially reducing the braking force of the retarder unit if a vehicle wheel is present in the retarder unit for more than a predetermined time.

10. Railway braking apparatus, comprising a section of track rail, a brake shoe, a support for the brake shoe movable between a brake applying position wherein the shoe is engaged with substantial force by the wheels of a car traversing the rail and a brake releasing position wherein the shoe is not so engaged, means biasing the support to its brake applying position, and time-controlled means for delaying movement of the support to its brake releasing position by a force due to a vehicle wheel engaging said shoe.

11. Railway braking apparatus, comprising a braking bar associated with a track rail, means biasing the bar toward a position in which it frictionally engages the wheel of a car traversing the rail, and means responsive to displacement of the bar by a car wheel to substantially reduce the biasing force if the displacement continues for a predetermined time.

12. Railway braking apparatus, comprising a braking bar associated with a track rail, means biasing the bar toward a position in which it frictionally engages the wheel of a car traversing the rail, and means responsive to displacement of the bar by a car wheel to substantially reduce the biasing force if a vehicle stops with a wheel in engagement with the braking bar.

13. Railway braking apparatus, comprising a braking bar associated with a track rail, means biasing the bar toward a position in which it frictionally engages the wheel of a car traversing the rail, and means responsive to displacement of the bar by a car wheel to gradually reduce the biasing force as long as the displacement continues.

HERBERT L. BONE.

REFERENCES CITED

The following references are of record in the file of this patent:

UNITED STATES PATENTS

| Number | Name | Date |
|---|---|---|
| 2,129,301 | Bone | Sept. 6, 1938 |
| 2,273,481 | Bone | Feb. 17, 1942 |

FOREIGN PATENTS

| Number | Country | Date |
|---|---|---|
| 621,812 | Germany | Oct. 24, 1935 |
| 655,534 | Germany | Nov. 8, 1936 |